United States Patent
Prince et al.

(10) Patent No.: US 7,430,874 B2
(45) Date of Patent: Oct. 7, 2008

(54) VEHICLE AIR CONDITIONING SYSTEM

(75) Inventors: Antonio Prince, Lake Orion, MI (US); Ronald S. Eisenhour, West Bloomfield, MI (US); Alaa Meram, Sterling Heights, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 306 days.

(21) Appl. No.: 11/210,805

(22) Filed: Aug. 25, 2005

(65) Prior Publication Data

US 2007/0044491 A1 Mar. 1, 2007

(51) Int. Cl.
*B60H 1/32* (2006.01)
(52) U.S. Cl. ............... 62/199; 62/244; 62/513
(58) Field of Classification Search .......... 62/199–200, 62/239–244, 299, 513; 165/171, 164
See application file for complete search history.

(56) References Cited

U.S. PATENT DOCUMENTS

| | | | | |
|---|---|---|---|---|
| 2,385,667 A | * | 9/1945 | Webber | 62/509 |
| 2,521,040 A | * | 9/1950 | Casetta | 62/509 |
| 2,540,649 A | * | 2/1951 | Boylan | 62/299 |
| 2,577,359 A | * | 12/1951 | Magill | 62/285 |
| 2,687,626 A | * | 8/1954 | Bartlowe | 62/276 |
| 2,791,891 A | * | 5/1957 | Lance | 62/509 |
| 4,194,536 A | | 3/1980 | Stine et al. | |
| 4,697,635 A | * | 10/1987 | Longsworth et al. | 165/147 |
| 4,873,837 A | * | 10/1989 | Murray | 62/199 |
| 5,103,650 A | | 4/1992 | Jaster | |
| 5,630,326 A | * | 5/1997 | Nishishita et al. | 62/299 |
| 5,630,447 A | | 5/1997 | Jensen | |
| 5,678,418 A | * | 10/1997 | Ueno et al. | 62/200 |
| 5,724,817 A | * | 3/1998 | Nishishita | 62/216 |
| 6,401,485 B1 | * | 6/2002 | Hildreth, Jr. | 62/510 |
| 6,405,542 B1 | | 6/2002 | Matta | |
| 6,434,972 B1 | * | 8/2002 | Geiger et al. | 62/513 |
| 6,467,300 B1 | | 10/2002 | Noble | |
| 6,564,575 B1 | | 5/2003 | Schroeder et al. | |
| 7,055,337 B2 | * | 6/2006 | Horn et al. | 62/199 |
| 2004/0261450 A1 | | 12/2004 | Yoshino et al. | |

* cited by examiner

*Primary Examiner*—William E Tapolcai
(74) *Attorney, Agent, or Firm*—Global IP Counselors, LLP (57) ABSTRACT

A vehicle air conditioning system is disclosed that includes a compressor, a condenser, a front evaporator and a rear evaporator. The condenser is operably coupled to the compressor. The front evaporator is operably coupled to the condenser and the rear evaporator is operably coupled to the condenser. A high pressure tube operably couples the condenser to the rear evaporator and a low pressure tube operably couples the rear evaporator to the compressor. At least a portion of the high pressure tube and at least a portion of the low pressure tube are formed as a dual conduit section having side-by-side relationship for heat exchange therebetween.

28 Claims, 10 Drawing Sheets

VEHICLE AIR CONDITIONING SYSTEM

BACKGROUND OF THE INVENTION

1. Field of the Invention

The present invention generally relates to a vehicle air conditioning system. More specifically, the present invention relates to a vehicle air conditioning system that includes a high pressure tube and a low pressure tube with at least a portion of each being formed unitarily as a dual conduit section with a shared side-by-side wall.

2. Background Information

A typical automobile air conditioner includes a compressor, a condenser, an expansion valve or orifice tube, and an evaporator. The compressor compresses a cool vapor-phase refrigerant (e.g., Freon, R134a) to heat the same, resulting in a hot, high-pressure vapor-phase refrigerant. This hot vapor-phase refrigerant runs through a condenser, typically a coil that dissipates heat. The condenser condenses the hot vapor-phase refrigerant into liquid refrigerant. The liquid refrigerant is throttled through an expansion valve, which evaporates the refrigerant to a cold, low-pressure saturated liquid-vapor-phase refrigerant. This cold saturated liquid-vapor-phase refrigerant runs through the evaporator, typically a coil that absorbs heat from the air fed to the passenger compartment.

Larger vehicles require increased air conditioning capacity for proper cooling of the vehicle passenger compartment on hot summer days. One recent improvement to air conditioning systems in larger vehicles has been the introduction of a rear evaporator for cooling a rearward portion of the passenger compartment.

A slugging problem sometimes occurs in systems having a front evaporator and a rear evaporator. Once an air conditioner system is shut down, liquid refrigerant migrates to the low pressure side of the refrigerant system as the system equilibrates. Sometimes this liquid refrigerant can migrate to the lines adjacent to the compressor. When the air conditioning system is turned on again, the liquid refrigerant is drawn into the compressor. However, the liquid refrigerant is not compressible. Thus, as the compressor tries to compress this liquid refrigerant, an undesirable noise can emanate from the compressor, which is known as liquid refrigerant slugging. Liquid refrigerant slugging can cause premature wear within the compressor and is an unpleasant noise to hear.

In view of the above, it will be apparent to those skilled in the art from this disclosure that there exists a need for an improved air conditioning system that minimizes or eliminates liquid refrigerant slugging and/or improves efficiency by providing intercooling between high and low pressure portions. This invention addresses this need in the art as well as other needs, which will become apparent to those skilled in the art from this disclosure.

SUMMARY OF THE INVENTION

It has been discovered that intercooling of portions of an air conditioning system can reduce or eliminate liquid refrigerant slugging in the compressor.

One object of the present invention is to provide a vehicle air conditioning system that reduces liquid refrigerant slugging in the compressor.

Another object of the present invention is to provide a vehicle air conditioning system that improves efficiency of the vehicle air conditioning system by providing intercooling between high and low pressure portions thereof.

In accordance with one embodiment of the present invention, a vehicle air conditioning system is provided with a compressor, a condenser, a front evaporator, a rear evaporator, a high pressure tube and a low pressure tube. The condenser is operably coupled to the compressor. The rear evaporator operably coupled to the condenser. The high pressure tube operably couples the condenser to the rear evaporator and the low pressure tube operably couples the rear evaporator to the compressor. At least a portion of the high pressure tube and at least a portion of the low pressure tube are formed as a dual conduit section having side-by-side relationship for heat exchange therebetween.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
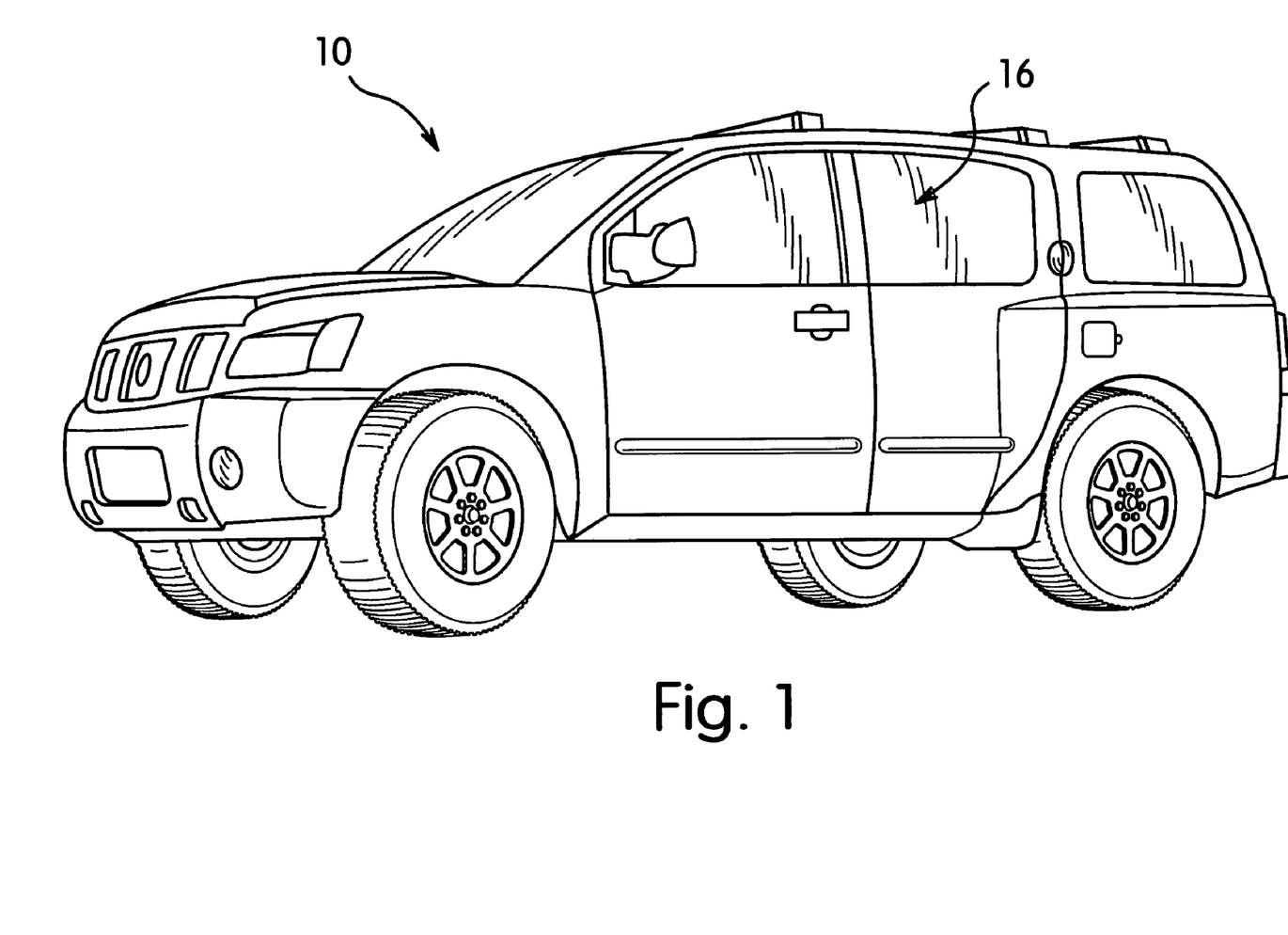
FIG. 1 is a perspective view of a vehicle that is equipped with a vehicle air conditioning system in accordance with the present invention.
Figure 2:
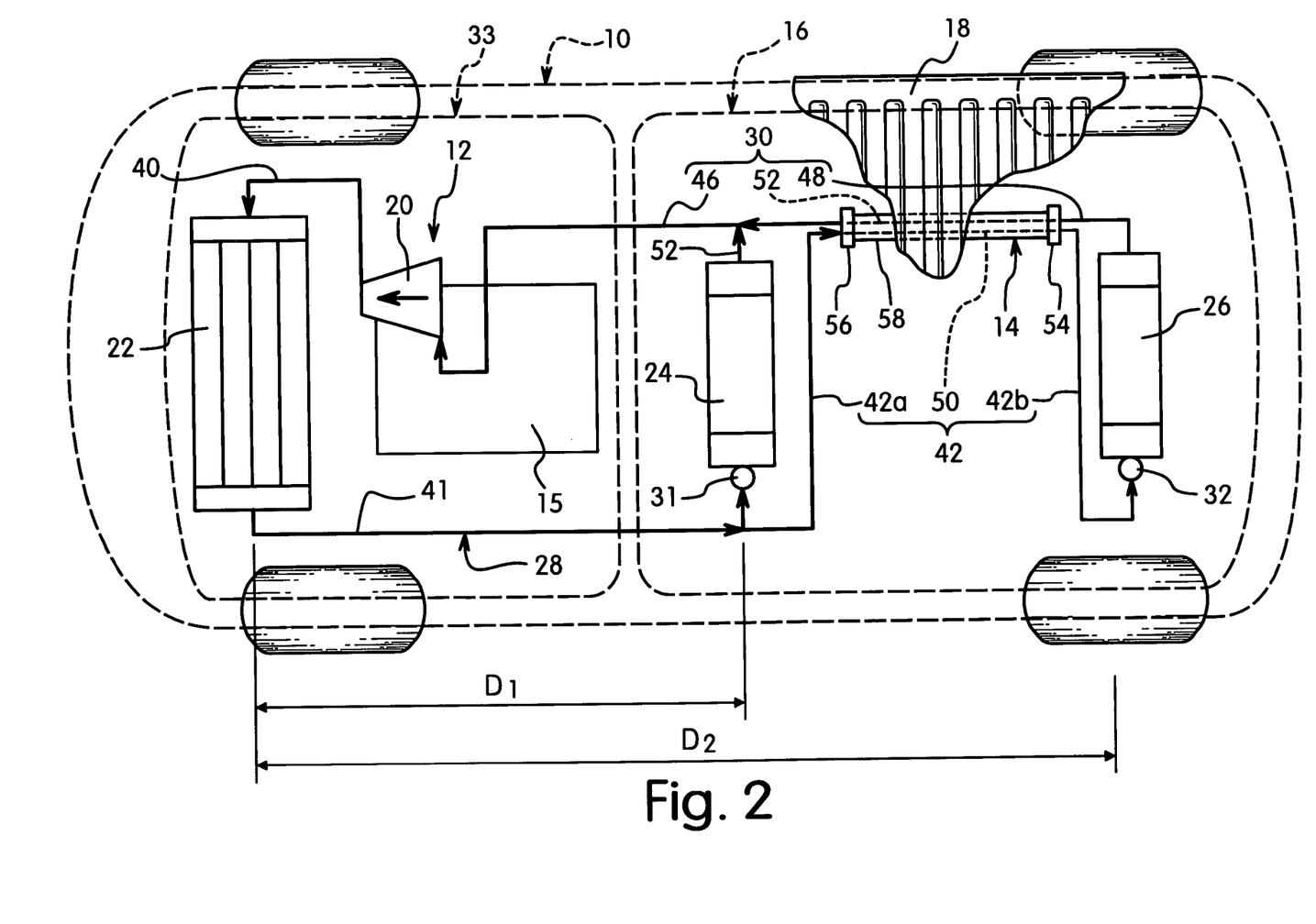
FIG. 2 is a simplified, schematic top plan view of the vehicle and the vehicle air conditioning system with a dual conduit section in accordance with the present invention.

Referring initially to FIGS. 1 and 2, a vehicle 10 is illustrated that includes a vehicle air conditioning system 12 having a refrigerant conveying dual conduit section 14 in accordance with a first embodiment of the present invention. The vehicle 10 includes an engine 15 and a relatively large passenger compartment or cabin 16. The passenger compartment 16 of the vehicle 10 includes a floor 18 (FIG. 2) and has considerable volume that requires a powerful air conditioning system for adequate cooling in hot summer weather, such as the vehicle air conditioning system 12. The vehicle air conditioning system 12 is improved by inclusion of the dual conduit section 14, as described in greater detail below.

The vehicle air conditioning system 12 has a refrigerant circuit that basically includes a compressor 20, a condenser 22, a front evaporator 24 and a rear evaporator 26. These components 20, 22, 24 and 26 are conventional components that are well known in the air conditioning field. Since these components 20, 22, 24 and 26 are well known in the air conditioning field, the precise construction of the components 20, 22, 24 and 26 will not be discussed or illustrated in detail herein. The operations of the air conditioning system 12 are controlled by a set of operator controls (not shown) that are located in the passenger compartment or vehicle cabin 16. The operator controls typically will include an ON/OFF switch, a temperature control and a blower of fan speed control. Once the operator turns on the air conditioning system 12, a control signal is received by a computer controller (not shown) of the computer or engine control unit to regulate the air temperature in the passenger compartment or vehicle cabin 16. In other words, the computer controller operates the air conditioning system 12 in accordance with the settings of the operator controls. Since the controls and general operation of air conditioning system are well known the controls and general operation of air conditioning system 12 will not be discussed or illustrated in further detail herein.

As explained in greater detail below, the refrigerant circuit further includes a high pressure tubing 28 and a low pressure tubing 30. The high pressure tubing 28 and the low pressure tubing 30 operatively connect the various components of the vehicle air conditioning system 12 to one another. A portion of each of the high pressure tubing 28 and the low pressure tubing 30 forms a part of the dual conduit section 14 of the present invention as explained below. The dual conduit section 14 forms an intercooled structure in which heat transfer from the high pressure/high heat refrigerant to the low pressure/low heat refrigerant occurs quicker causing the system to reach an equilibrium state faster than without an integrated intercooled structure as in the present invention. Moreover, this heat transfer from the high pressure/high heat refrigerant to the low pressure/low heat refrigerant results in low pressure/low heat refrigerant being less likely to migrate to the compressor 20 since the heat transfer and equilibrium occurs faster. As a result slugging is also less likely to occur.

The high pressure tubing 28 is provided with two thermal expansion valves 31 and 32 that are disposed in the high pressure tubing 28 adjacent the inlets of the evaporators 24 and 26, respectively, for regulating refrigerant flow from the condenser 22 to the evaporators 24 and 26. Thus, the refrigerant (e.g., Freon, R134a) is circulated through the refrigerant circuit of the vehicle air conditioning system 12 to cool the passenger compartment or vehicle cabin 16.

The compressor 20 is preferably mounted on the engine 15 within an engine compartment 33. The compressor 20 receives rotary power from the engine 15 in a conventional manner, for example, via a belt driven pulley (not shown) and an electromagnetic clutch apparatus (not shown). Alternatively, the compressor 20 can be mounted anywhere within the vehicle 10 and can be provided with an alternative power source, such as an electric motor (not shown).

The condenser 22 is preferably mounted in the engine compartment 33 in front of the engine 15. Thus, the condenser 22 is positioned to receive a flow of air as the vehicle 10 moves for dissipation of heat. Additionally, the condenser 22 can be provided with a conventional circulating fan 34 (FIG. 3) that provides additional air flow through the condenser 22. The condenser 22 condenses the hot vapor-phase refrigerant into a liquid-phase refrigerant or a saturated liquid-vapor-phase refrigerant. In the preferred embodiment of the present invention, the condenser 22 condenses the refrigerant by air cooling using the circulating fan 34. Thus, the condenser 22 of the preferred embodiment can be referred to as a heat removal device. The condensed refrigerant is then delivered through the expansion valves 31 and 32, which expands the liquid-phase or saturated liquid-vapor-phase refrigerant to a cold, low-pressure liquid-vapor-phase refrigerant having a higher vapor content. The cold liquid-vapor-phase refrigerant (having a higher vapor content than the refrigerant exiting the condenser) then runs through the evaporators 24 and 26, which are typically coils that absorbs heat from and cools the air delivered to the passenger compartment or vehicle cabin 16.

The front evaporator 24 is preferably positioned in a forward location within the passenger compartment or vehicle cabin 16, while the rear evaporator 26 is preferably positioned in a rearward location within the passenger compartment or vehicle cabin 16. As shown, the thermal expansion valves 31 and 32 are preferably located at the inlet portion of the front and evaporators 24 and 26 as is well known in the art. The thermal expansion valves 31 and 32 are shown schematically in FIGS. 2 and 3.

Figure 3:
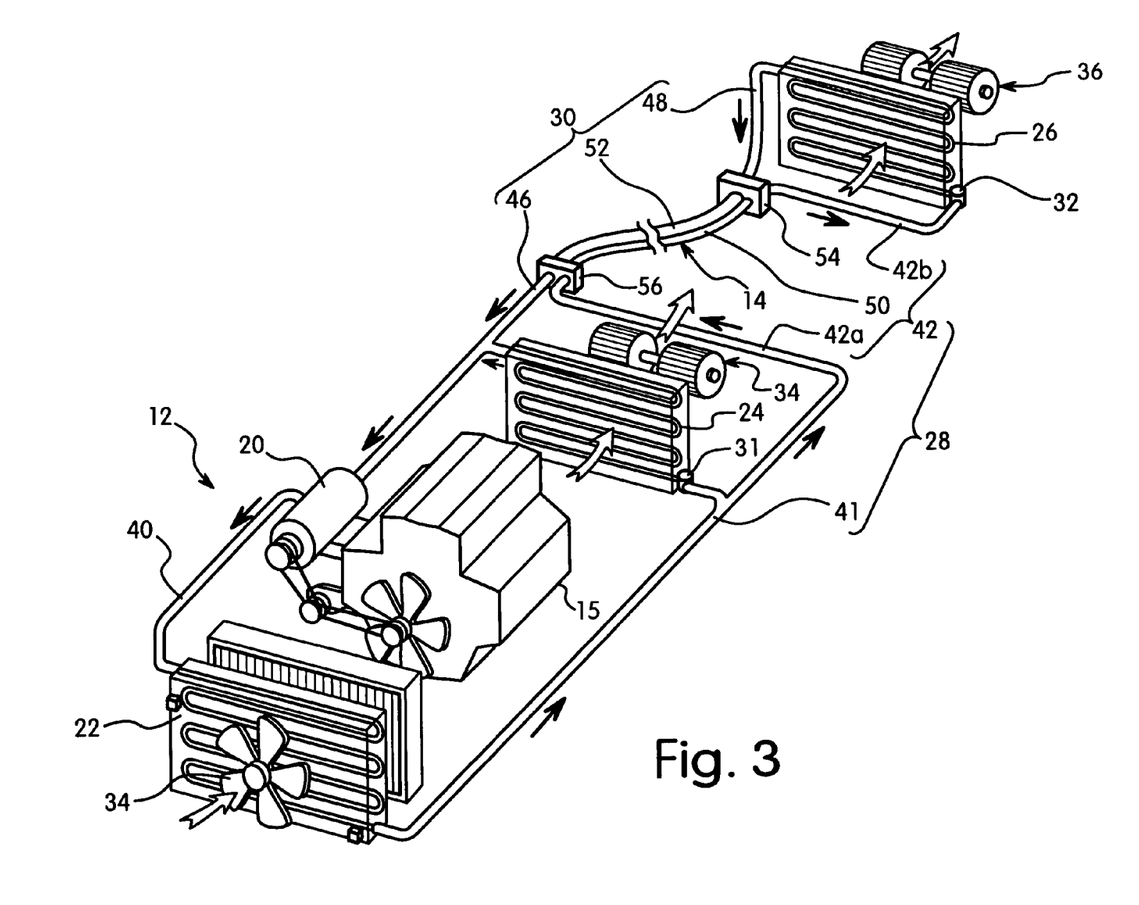
FIG. 3 is a simplified, perspective view of selected portions of the vehicle air conditioning system and the dual conduit section in accordance with the present invention.

As shown in FIG. 3, typically, the front evaporator 24 is provided with the circulating fan 34 that draws air through the front evaporator 24 and blows the cool air into the passenger compartment 16. Thus, the circulating fan 34 assists the front evaporator 24 in absorbing heat from within the passenger compartment 16 to cool the passenger compartment 16. As shown in FIG. 2, the front evaporator 24 is located at a distance $D_1$ away from the condenser 22.

Similarly, the rear evaporators 26 is provided with a circulating fan 36 that draws air through the rear evaporator 26 and blow the cool air into the passenger compartment 16. Thus, the circulating fan 36 assists the rear evaporator 26 in absorbing heat from within the passenger compartment 16 to cool the passenger compartment 16. The rear evaporator 26 is located at a distance $D_2$ away from the condenser 22, as shown in FIG. 2. The distance $D_2$ is greater than the distance $D_1$. In other words, the rear evaporator 26 is farther away from the condenser 22 than the front evaporator 24.

As high pressure refrigerant passes through the thermal expansion valves 31 and 32, the refrigerant expands and drops in temperature entering into a low pressure state in the front and rear evaporators 24 and 26. In the front and rear evaporators 24 and 26, the low pressure (low temperature) refrigerant absorbs heat from the passenger compartment 16 to cool the passenger compartment 16. Thereafter, the low pressure tubing 30 conveys low pressure refrigerant from the front and rear evaporators 24 and 26 to the compressor 20 of the vehicle air conditioning system 12.

Now, the high pressure tubing 28 will be discussed in more detail. The high pressure tubing 28 operatively connects together the various high pressure sides of the components of the vehicle air conditioning system 12. Specifically, the high pressure tubing 28 conveys compressed (high pressure) refrigerant leaving the compressor 20 to the condenser 22 and then from the condenser 22 to the thermal expansion valves 31 and 32 that are proximate the front and rear evaporators 24 and 26. The high pressure tubing 28 basically includes a compressor outlet section 40, a front condenser outlet section 41 and a rear condenser outlet section 42 that includes a part of the dual conduit section 14 (FIGS. 4-7).

The compressor outlet section 40 is a sealed conduit that is connected between the compressor 20 and the condenser 22. The compression action of the compressor 20 heats the refrigerant, resulting in a hot, high-pressure vapor-phase refrigerant. Thus, the compressor outlet section 40 is configured to convey compressed or high pressure refrigerant outputted from the compressor 20 to the condenser 22 for dissipation of heat. In the condenser 22, this hot vapor-phase refrigerant is flows through the coils of the condenser 22 with the circulating fan 34 blowing cool air through the coils of the condenser 22 to dissipate heat.

The front condenser outlet section 41 is a sealed conduit that is connected to the condenser 22 and the thermal expansion valve 31, which is proximate the front evaporator 24. The front condenser outlet section 41 is further connected to the rear condenser outlet section 42 such that a first portion of the refrigerant is sent to the front evaporator 24 and a second portion of the refrigerant is sent to the rear evaporator 26. In other words, the front condenser outlet section 41 is configured to convey high pressure refrigerant from the condenser 22 to the thermal expansion valve 31, which is proximate the front evaporator 24, and to the rear condenser outlet section 42 that is connected to the thermal expansion valve 32, which is proximate the rear evaporator 26.

The rear condenser outlet section 42 includes a first connecting tube 42a, a second connecting tube 42b and a portion of the dual conduit section 14 that fluidly connects the first and connecting tubes 42a and 42b together as described in greater detail below. Thus, the first connecting tube 42a is connected at a first end to the front condenser outlet section 41 and at a second end to the dual conduit section 14 to fluidly interconnect the front condenser outlet section 41 to the dual conduit section 14.

Now, the low pressure tubing 30 will be discussed in more detail. The low pressure tubing 30 operatively connects together the various low pressure sides of the components of the vehicle air conditioning system 12. Specifically, the low pressure tubing 30 conveys gaseous (low pressure) refrigerant leaving the front and rear evaporators 24 and 26 to the compressor 20. The low pressure tubing 30 basically includes a front evaporator outlet section 46 and a rear evaporator outlet section 48 that includes a part of the dual conduit section 14 (FIGS. 4-7). The rear evaporator outlet section 48 is connected to an outlet of the rear evaporator 26 and to one end of the dual conduit section 14. In other words, the rear evaporator outlet section 48 is configured to convey low pressure refrigerant from the rear evaporator 26 to the dual conduit section 14. The front evaporator outlet section 46 is connected to the dual conduit section 14 and to an outlet of the front evaporator 24. The front evaporator outlet section 46 conveys low pressure refrigerant from the dual conduit section 14 and the front evaporator 24 to the compressor 20.

It should be understood from the drawings and description herein, that the high pressure tubing 28 and the low pressure tubing 30 can have any of a variety of configurations and connections. The descriptions above of the various connections are merely one example of the configurations of the high pressure tubing 28 and the low pressure tubing 30 and connections to the dual conduit section 14.

Figure 4:
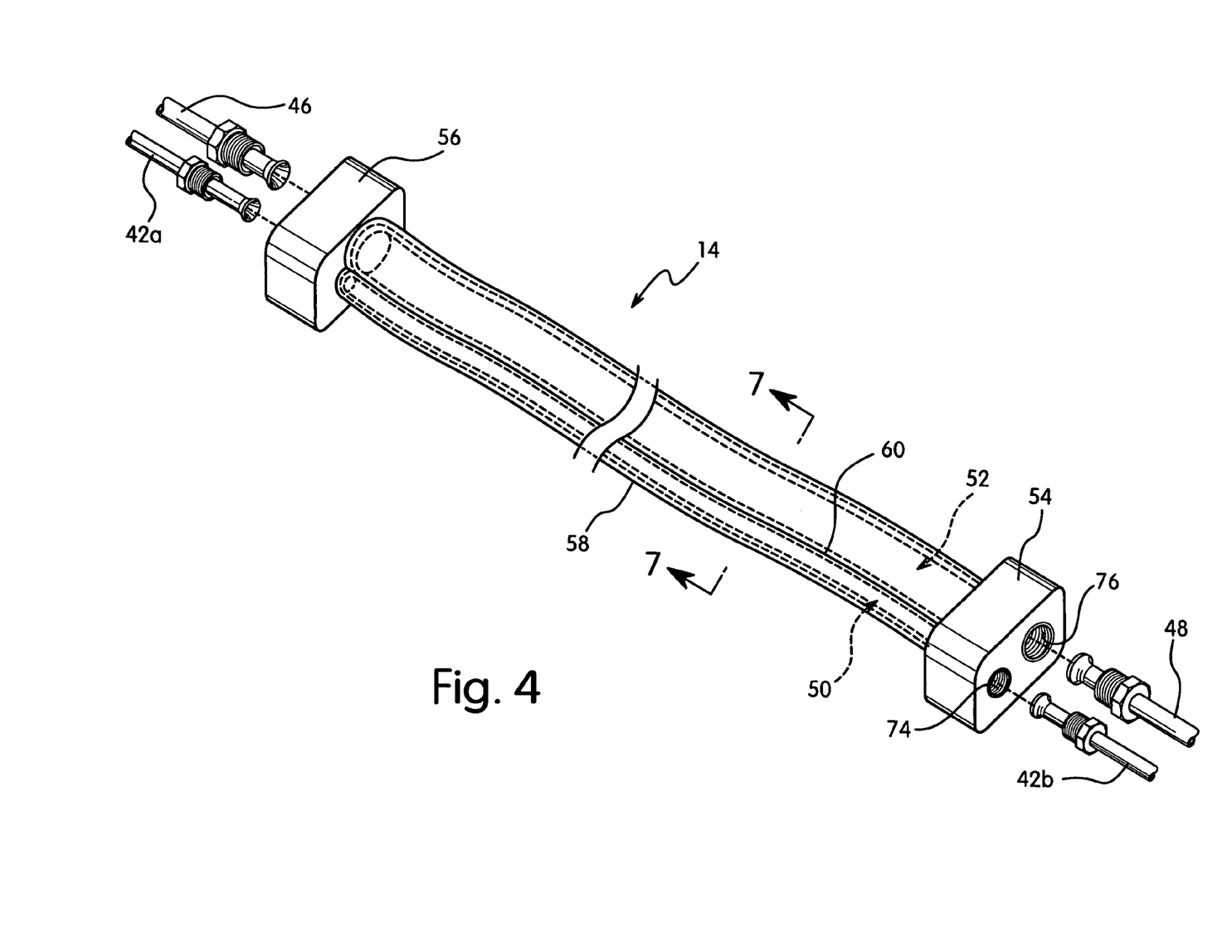
FIG. 4 is a perspective view of the dual conduit section removed from the vehicle and the vehicle air conditioning system in accordance with the present invention.
Figure 5:
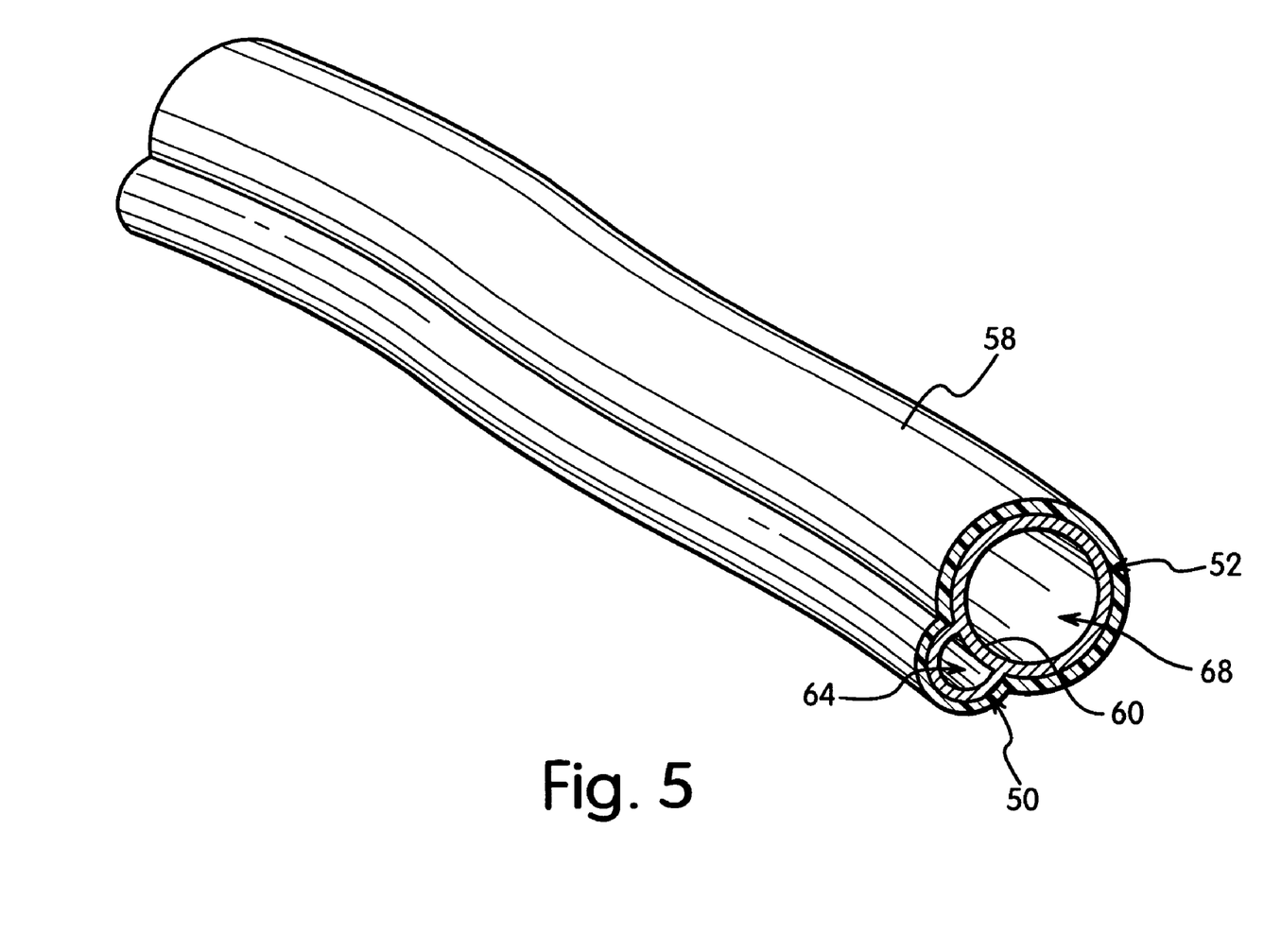
FIG. 5 is a partial perspective view of a portion of the dual conduit section revealing a low pressure passageway, a shared wall, a high pressure passageway and insulation in accordance with the present invention.
Figure 6:
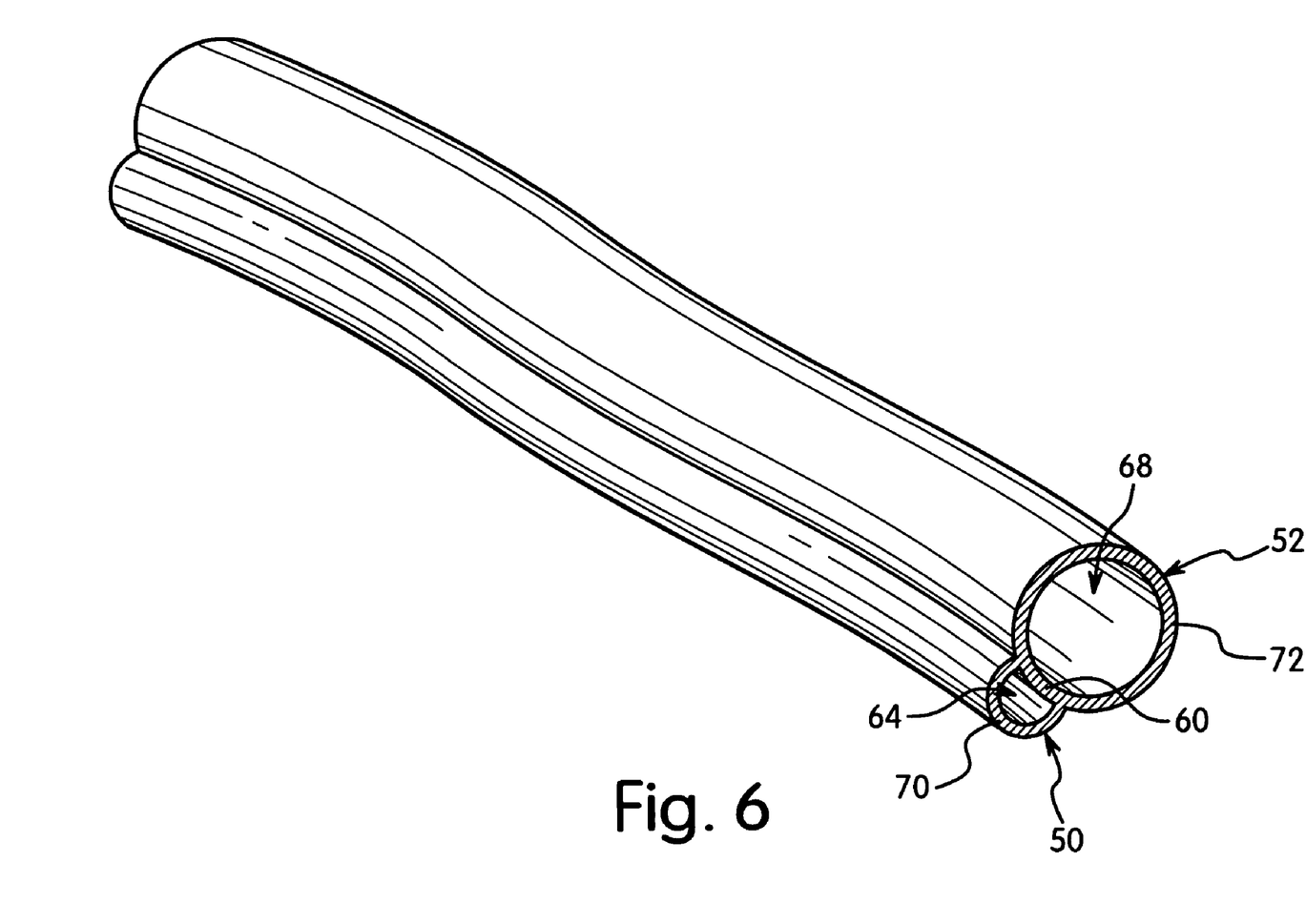
FIG. 6 is a partial perspective view, similar to FIG. 5, of a portion of the dual conduit section with the insulation removed.
Figure 7:
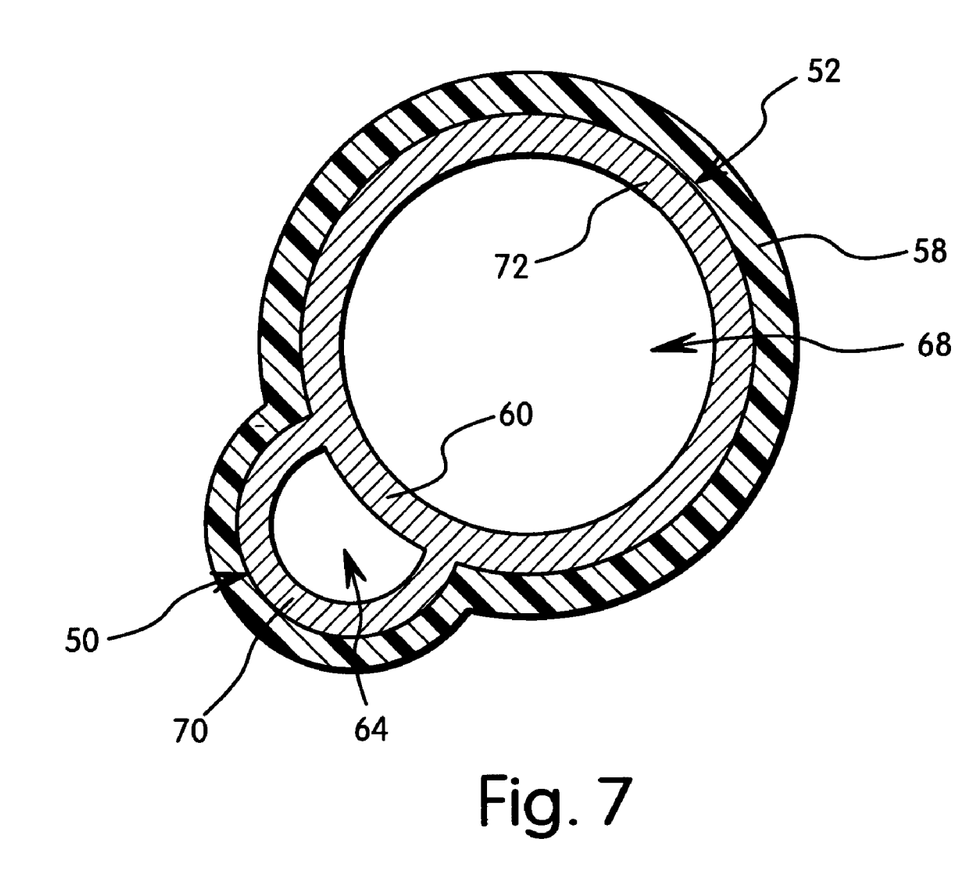
FIG. 7 is an enlarged cross-sectional view showing the low pressure passageway, the shared wall and the high pressure passageway of the dual conduit section in accordance with the present invention.

The dual conduit section 14 is now described in greater detail with reference to FIGS. 4-7. The dual conduit section 14 is arranged and configured to extend under the floor 18 of the vehicle 10, as indicated in FIG. 2. As previously mentioned, the dual conduit section 14 forms a part of the high pressure tubing 28 and a part of the low pressure tubing 30. As shown in FIG. 4, the dual conduit section 14 is a unitary assembly that is arranged and configured for installation within the vehicle air conditioning system 12 of the vehicle 10 as a unit. As shown in FIGS. 5-7, the dual conduit section 14 basically includes a high pressure tube 50, a low pressure tube 52, a first connector block 54, a second connector block 56, and an insulation layer 58. The high pressure tube 50 and the low pressure tube 52 have a common or shared wall 60 that partially defines a high pressure refrigerant passageway 64 of the high pressure tube 50 and a low pressure refrigerant passageway 68 of the low pressure tube 52.

Thus, the high pressure refrigerant passageway 64 of the high pressure tube 50 interconnects the first and second connecting tubes 42a and 42b together for conveying the high pressure refrigerant from the front condenser outlet section 41 to the thermal expansion valve 35 proximate the rear evaporator 26. The low pressure refrigerant passageway 68 of the low pressure tube 52 interconnects the evaporator outlet section 46 and the rear evaporator outlet section 48 together for conveying the low pressure refrigerant from the outlet of the rear evaporator 26 to the compressor 20.

As shown in FIGS. 6 and 7, the high pressure tube 50 and the low pressure tube 52 of the dual conduit section 14 are formed integrally as a single element by, for instance, an extruding process. The shared wall 60 extends the entire length of the dual conduit section 14, from the first connector block 54 to the second connector block 56. As shown in FIG. 7, the high pressure tube 50 of the dual conduit section 14 has an outer wall 70 that at least partially surrounds the high pressure refrigerant passageway 64. The outer wall 70 is integrally formed (unitarily attached) with the shared wall 60. Thus, the outer wall 70 and the shared wall 60 generally circumferentially define the high pressure refrigerant passageway 64. The low pressure tube 52 of the dual conduit section 14 has an outer wall 72 that at least partially surrounds a low pressure refrigerant passageway 68. The outer wall 72 is integrally formed (unitarily attached) with the shared wall 60. The outer wall 72 and the shared wall 60 generally circumferentially define the low pressure refrigerant passageway 68.

The shared wall 60, the outer wall 70 and the outer wall 72 of the dual conduit section 14 are preferably made of aluminum, or other metallic material or alloy with a desirable heat transmission capability. In a preferred embodiment, at least the shared wall 60 is much thicker than the walls in conventional pressurized refrigerant lines such as the remaining lines or tubes of the high pressure tubing 28 and the low pressure tubing 30. Additionally, the outer wall 70 and the outer wall 72 are preferably manufactured to have a thickness that is greater than wall thickness in conventional pressurized refrigerant lines such as the remaining lines or tubes of the high pressure tubing 28 and the low pressure tubing 30. For instance, the thickness of conventional pressurized refrigerant lines is typically determined by the strength required to withstand the internal pressures generated by pressurized refrigerant within the lines. However for design of the present invention, he shared wall 60, the outer wall 70 and the outer wall 72 are designed with a significant increase in mass in order to provide heat retention or heat sink capabilities. Of course, only the shared wall 60 could be configured with an increased mass to provide heat sink capabilities. In the illustrated embodiment of the present invention, the shared wall 60, the outer wall 70 and the outer wall 72 are all designed with additional thickness which provides heat sink capabilities.

During operation of the vehicle air conditioning system 12, refrigerant within the low pressure tubing 30, the front evaporator 24 and the rear evaporator 26 is usually in a vaporized state with little or no liquid refrigerant present. Further, the refrigerant in the high pressure tubing 28 is typically in a compressed liquid state with little or no vaporized refrigerant present. However, once the vehicle air conditioning system 12 is shut off, the refrigerant in the vehicle air conditioning system 12 shifts toward a system wide equilibrium. Specifically, high pressure liquid migrates to the low pressure vapor side of the vehicle air conditioning system 12 such that vapor and liquid states equalize throughout the vehicle air conditioning system 12. At the same time, higher temperature high pressure refrigerant dissipates heat while the lower temperature low pressure refrigerant typically absorbs heat until equilibrium has been reached within the vehicle air conditioning system 12. The high pressure refrigerant passageway 64 and the low pressure refrigerant passageway 68 of the dual conduit section 14 both contact the shared wall 60 allowing heat transfer therebetween. Therefore, the refrigerant in the low pressure refrigerant passageway 68 is heated by warmer refrigerant in the high pressure refrigerant passageway 64 thereby increasing the vapor pressure within the low pressure refrigerant passageway 68 and the low pressure tubing 30. Thus, refrigerant in the low pressure refrigerant passageway 68 can more readily remain in a partial vapor state and high pressure liquid refrigerant does not move so rapidly toward the low pressure side of vehicle air conditioning system 12.

Similarly, the refrigerant in the high pressure refrigerant passageway 64 is cooled by lower temperature refrigerant in the low pressure refrigerant passageway 68 thereby decreasing the vapor pressure within the high pressure refrigerant passageway 64. Thus, since the lower temperature decreases pressure, refrigerant in the high pressure refrigerant passageway 64 is not as strongly urged the low pressure side of vehicle air conditioning system 12. Therefore, with the shared wall 60 providing heat transfer capabilities, equilibrium in the vehicle air conditioning system 12 is achieved more rapidly and with a potential reduction in liquid refrigerant slugging. In this illustrated embodiment, the shared wall 60 is preferably a single shared wall having a single wall thickness. However, the shared wall 60 can be a pair of separate walls having a double wall thickness as shown in one of the later embodiments, if needed and/or desired.

There is an additional benefit of the heat transfer characteristics of the shared wall 60 in the dual conduit section 14. During operating of the vehicle air conditioning system 12, the heat transfer across the shared wall 60 provides intercooling between the high pressure refrigerant passageway 64 and low pressure refrigerant passageway 68. Specifically, refrigerant exiting the rear evaporator 26 has absorbed heat from the vehicle passenger compartment 16 but is still typically at a temperature lower than the temperature of the high pressure refrigerant in the high pressure refrigerant passageway 64 of the dual conduit section 14. Therefore, as high pressure refrigerant passes through the high pressure refrigerant passageway 64, it is further cooled by the low pressure refrigerant passing through the low pressure refrigerant passageway 68 of the dual conduit section 14.

The first connector block 54 of the dual conduit section 14 is preferably a solid block of material arranged to provide simple connection and disconnection of the dual conduit section 14 from elements of the high pressure tubing 28 and the low pressure tubing 30. The first connector block 54 is fixedly attached to rearward ends of the shared wall 60, the outer wall 70 and the outer wall 72. The first connector block 54 can be formed integrally with the shared 60, the outer wall 70 and the outer wall 72, or can be welded thereto as needed and/or desired.

The first connector block 54 is formed with a high side threaded opening 74 that is fluidly connected to the high pressure tube 50, and a low side threaded opening 76 that is fluidly connected to the low pressure tube 52. The high side threaded opening 74 is arranged to receive a corresponding fitting on the end of the second connecting tube 42b of the high pressure tubing 28. Similarly, the low side threaded opening 76 is arranged to receive a corresponding fitting on the end of the rear evaporator outlet section 48 of the low pressure tubing 30 to fluidly connect the end of the rear evaporator outlet section 48 to the low pressure refrigerant tube 52.

The second connector block 56 is identical to the first connector block 54, except for its orientation and location. Thus, the second connector block 56 of the dual conduit section 14 is preferably a solid block of material arranged to provide simple connection and disconnection of the dual conduit section 14 from elements of the high pressure tubing 28 and the low pressure tubing 30. The second connector block 56 is fixedly attached to forward ends of the shared wall 60, the outer wall 70 and the outer wall 72. Also, like the first connector block 54, the second connector block 56 is formed with a high side threaded opening and a low side threaded opening. The high side threaded opening of the second connector block 56 is arranged to receive a corresponding fitting on the end of the first connecting tube 42a of the high pressure tubing 28 to fluidly connect the high pressure tubing 28 to the high pressure refrigerant tube 50. Similarly, the low side threaded opening of the second connector block 56 is arranged to receive a corresponding fitting on the end of the front evaporator outlet section 46 of the low pressure tubing 30 to fluidly connect the end of the front evaporator outlet section 46 to the low pressure refrigerant tube 52. The second connector block 56 can be formed integrally with the shared wall 60, the outer wall 70 and the outer wall 72, or may be welded thereto as needed and/or desired.

The insulation layer 58 completely surrounds the outer periphery of the outer wall 70 and the outer wall 72. The insulation layer 58 can be formed by any of a variety of insulating materials, such as insulating foams or wrapable insulation materials. The insulating layer 58 extends the full length of the outer wall 70 and the outer wall 72, from the first connector block 54 to the second connector block 56. The insulation layer 58 enhances the heat sink and heat transfer characteristics the shared wall 60, the outer wall 70 and the outer wall 72 by limiting or preventing heat exchange with ambient conditions. Rather, most, if not all, heat exchanging within the dual conduit section 14 occurs between the refrigerant within the high pressure refrigerant passageway 64 and the refrigerant in the low pressure refrigerant passageway 68.

Alternate Embodiments

Figure 8:
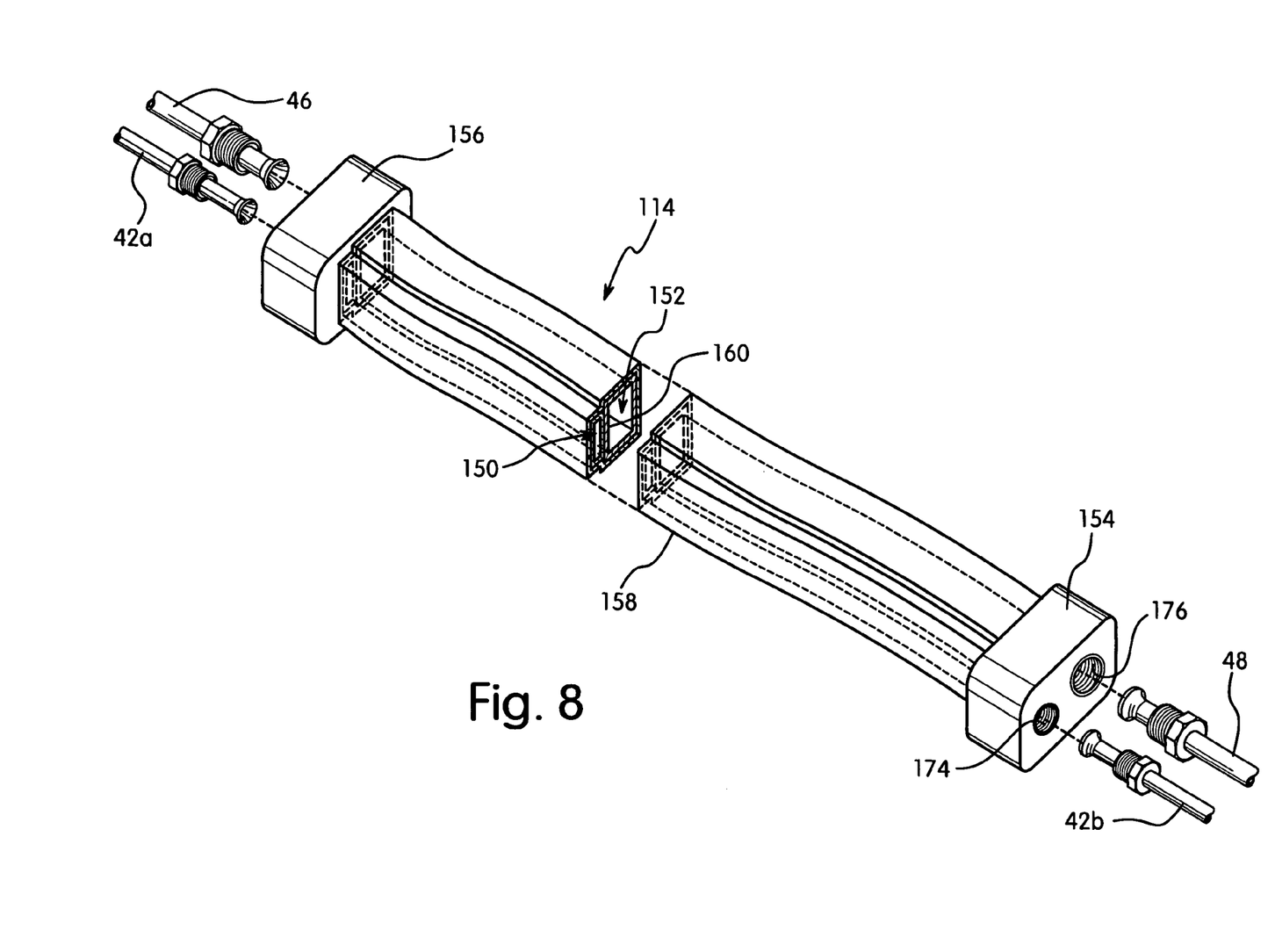
FIG. 8 a perspective view of a dual conduit section in accordance with a second embodiment of the present invention.
Figure 9:
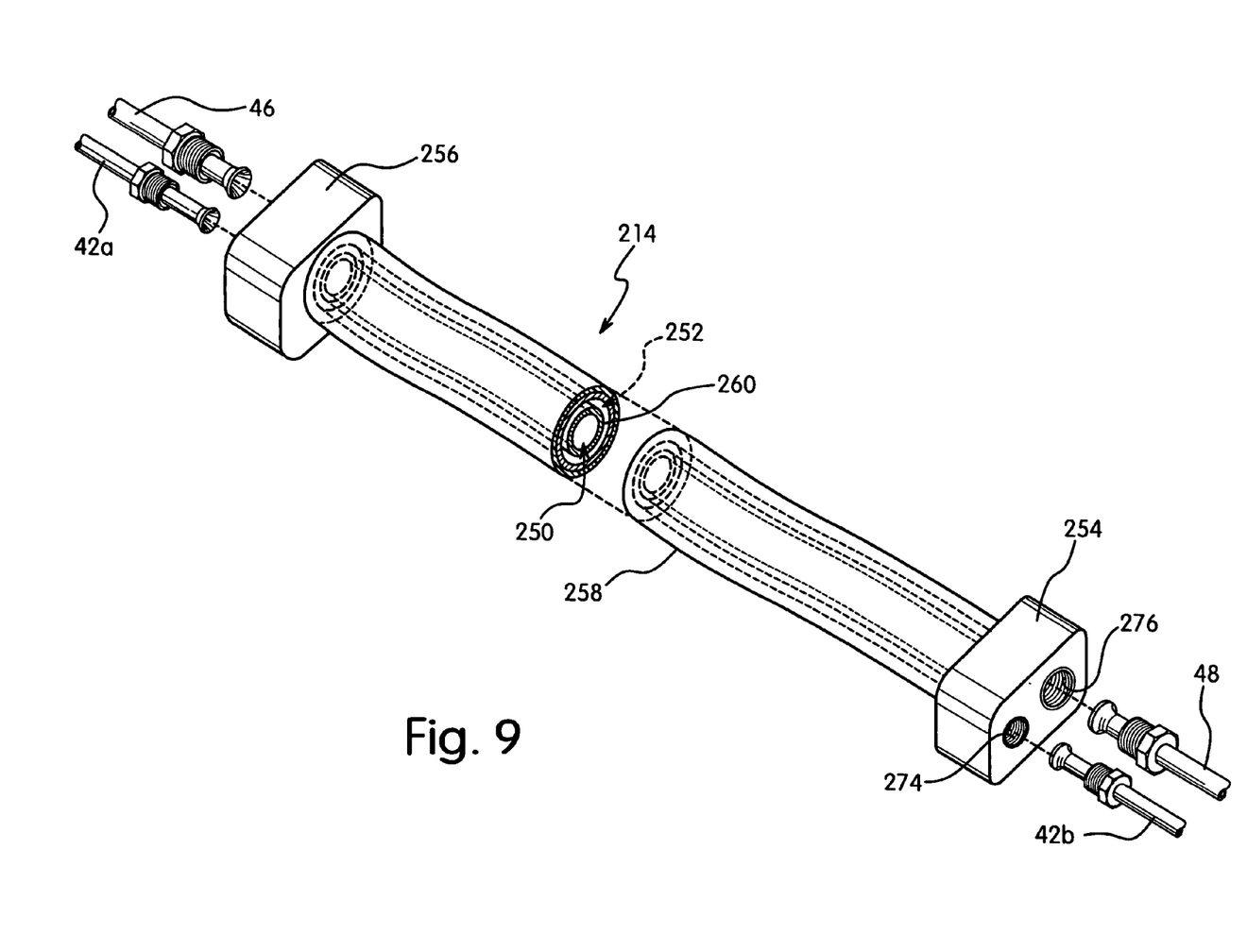
FIG. 9 a perspective view of a dual conduit section in accordance with a third embodiment of the present invention.
Figure 10:
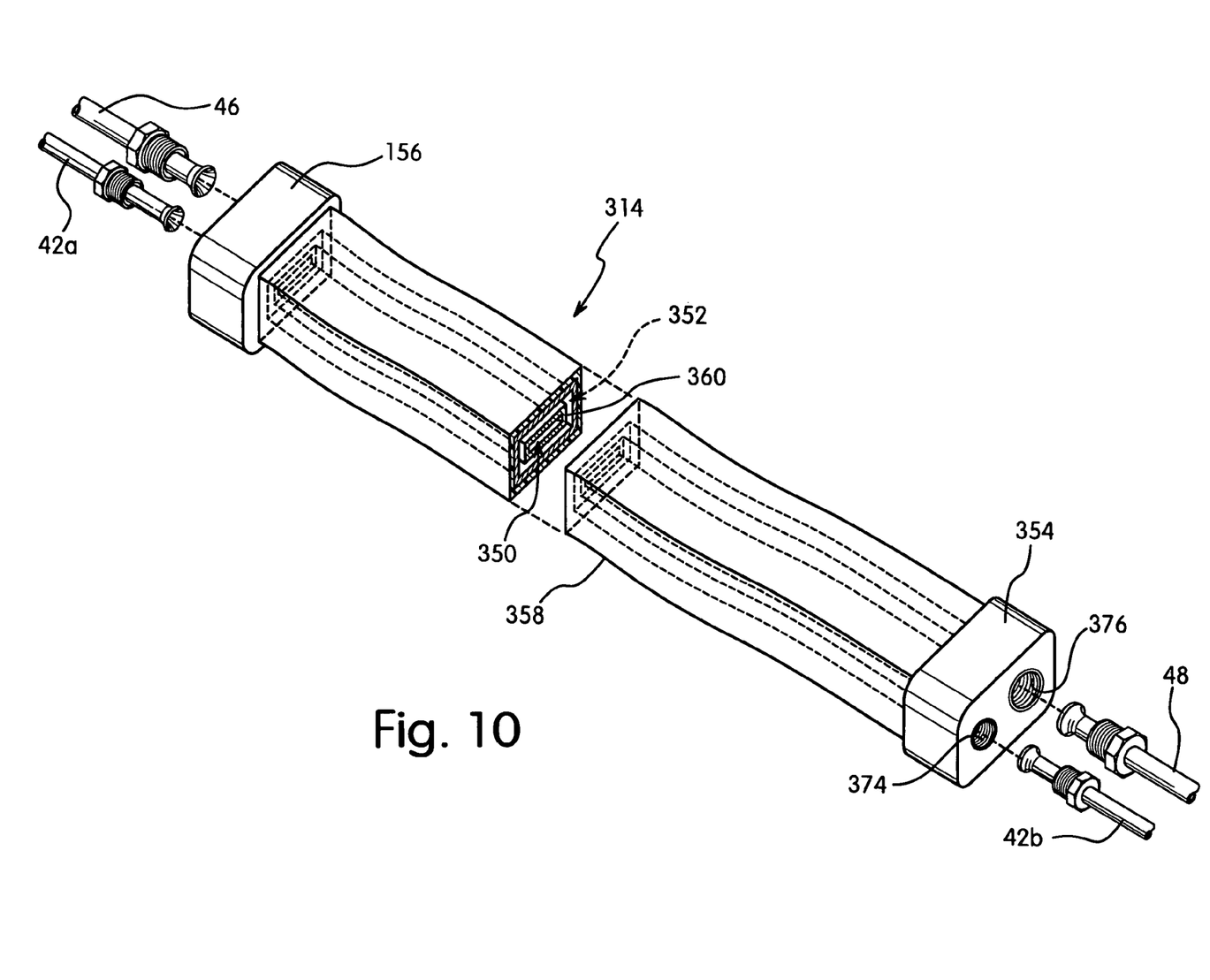
FIG. 10 a perspective view of a dual conduit section in accordance with a fourth embodiment of the present invention.

Referring now to FIGS. 8-10, alternate configurations or shapes for the dual conduit section 14 will be discussed. Basically, the dual conduit sections 114, 214 and 314 shown in FIGS. 8-10 are used in the vehicle air conditioning system 12, i.e., connected to the first and second connecting tubes 42a and 42b for conveying the high pressure refrigerant and connected to the evaporator outlet section 46 and the rear evaporator outlet section 48 for conveying the low pressure refrigerant. Unless otherwise indicated in the following description or shown in the drawings, the descriptions of the vehicle air conditioning system 12 and the dual conduit section 14 applies to the dual conduit sections 114, 214 and 314. Thus, the descriptions of the parts of the dual conduit sections 114, 214 and 314 that perform the same function as that of the dual conduit section 14 may be omitted for the sake of brevity.

Referring to FIG. 8, the dual conduit section 114 basically includes a pair of refrigerant tubes 150 and 152, a first connector block 154 and a second connector block 156. An insulation layer 158 completely surrounds the outer periphery of the refrigerant tubes 150 and 152. In this embodiment, the refrigerant tubes 150 and 152 are rectangularly shaped. The refrigerant tubes 150 and 152 can be either formed integrally as a single element by, for instance, an extruding process or formed as two separate tubes that are fixedly coupled together. In either case, the dual conduit section 114 of FIG. 8 has a shared wall 160 formed between the refrigerant tubes 150 and 152 that extends the entire length of the dual conduit section 114 from the first connector block 154 to the second connector block 156. In this illustrated embodiment, the shared wall 160 has a double wall thickness. However, the shared wall 160 can have a single wall thickness as in the dual conduit section 14, if needed and/or desired. As shown in FIG. 8, the refrigerant tube 150 is a high pressure/high temperature refrigerant tube, while the refrigerant tube 152 is a low pressure/low temperature refrigerant tube. The outer wall is integrally formed (unitarily attached) with the shared wall 160.

The first connector block 154 is formed with a high side threaded opening 174 that is fluidly connected to the refrigerant tube 150 by a first internal passageway, and a low side threaded opening 176 that is fluidly connected to the refrigerant tube 152 by a second internal passageway. The high side threaded opening 174 is arranged to receive a corresponding fitting on the end of the second connecting tube 42b of the high pressure tubing 28. Similarly, the low side threaded opening 176 is arranged to receive a corresponding fitting on the end of the rear evaporator outlet section 48 of the low pressure tubing 30.

The second connector block 156 is identical to the first connector block 154, except for its orientation and location. Thus, the second connector block 156 of the dual conduit section 114 is preferably a solid block of material arranged to provide simple connection and disconnection of the dual conduit section 114 from elements of the high pressure tubing 28 and the low pressure tubing 30. The second connector block 156 is fixedly attached to forward ends of the refrigerant tubes 150 and 152.

Also, like the first connector block 154, the second connector block 156 is formed with a high side threaded opening and a low side threaded opening that are fluidly connected to the refrigerant tubes 150 and 152. The high side threaded opening of the second connector block 156 is arranged to receive a corresponding fitting on the end of the first connecting tube 42a of the high pressure tubing 28. Similarly, the low side threaded opening of the second connector block 156 is arranged to receive a corresponding fitting on the end of the front evaporator outlet section 46 of the low pressure tubing 30. The second connector block 156 can be formed integrally with the refrigerant tubes 150 and 152, or can be welded thereto as needed and/or desired.

The insulation layer 158 completely surrounds the outer periphery of the refrigerant tubes 150 and 152. The insulation layer 158 can be formed by any of a variety of insulating materials, such as insulating foams or wrapable insulation materials. The insulating layer 158 extends the full length of the refrigerant tubes 150 and 152, from the first connector block 154 to the second connector block 156.

Referring to FIG. 9, the dual conduit section 214 basically includes a pair of refrigerant tubes 250 and 252, a first connector block 254 and a second connector block 256. An insulation layer 258 completely surrounds the outer periphery of the refrigerant tubes 250 and 252. In this embodiment, the refrigerant tubes 250 and 252 are circularly shaped and concentrically arranged. The refrigerant tubes 250 and 252 can be either formed integrally as a single element by, for instance, an extruding process or formed as two separate tubes that are fixedly coupled together. In either case, the dual conduit section 214 of FIG. 9 has a shared wall 260 formed between the refrigerant tubes 250 and 252 that extends the entire length of the dual conduit section 214 from the first connector block 254 to the second connector block 256. In this embodiment, one of the refrigerant 250 and 252 is a high pressure/high temperature refrigerant tube, while the other refrigerant tube is a low pressure/low temperature refrigerant tube. If the inner tube is the high pressure/high temperature refrigerant tube and the outer tube is the low pressure/low temperature refrigerant tube, then this arrangement is better for the prevention of slugging. On the other hand, if the inner tube is the low pressure/low temperature refrigerant tube and the outer tube is the high pressure/high temperature refrigerant tube, then this arrangement optimizes intercooling. It will be apparent to those skilled in the art from this disclosure that the internal cross sectional areas of the refrigerant tubes 250 and 252 will change depending on which of the refrigerant tubes 250 and 252 which tube is the high pressure/high temperature refrigerant tube and which tube is the low pressure/low temperature refrigerant tube.

The first connector block 254 is formed with a high side threaded opening 274 that is fluidly connected to one of the refrigerant tubes 250 and 252 by a first internal passageway, and a low side threaded opening 276 that is fluidly connected to the other one of the refrigerant tubes 250 and 252 by a second internal passageway. The high side threaded opening 274 is arranged to receive a corresponding fitting on the end of the second connecting tube 42b of the high pressure tubing 28. Similarly, the low side threaded opening 276 is arranged to receive a corresponding fitting on the end of the rear evaporator outlet section 48 of the low pressure tubing 30.

The second connector block 256 is identical to the first connector block 254, except for its orientation and location. Thus, the second connector block 256 of the dual conduit section 214 is preferably a solid block of material arranged to provide simple connection and disconnection of the dual conduit section 214 from elements of the high pressure tubing 28 and the low pressure tubing 30. The second connector block 256 is fixedly attached to forward ends of the refrigerant tubes 250 and 252 such that the high side threaded opening is fluidly connected to one of the refrigerant tubes 250 and 252, and the low side threaded opening is fluidly connected to the other one of the refrigerant tubes 250 and 252. Also, like the first connector block 254, the second connector block 256 is formed with a high side threaded opening and a low side threaded opening. The high side threaded opening of the second connector block 256 is arranged to receive a corresponding fitting on the end of the first connecting tube 42a of the high pressure tubing 28. Similarly, the low side threaded opening of the second connector block 256 is arranged to receive a corresponding fitting on the end of the front evaporator outlet section 46 of the low pressure tubing 30. The second connector block 256 can be formed integrally with the refrigerant tubes 250 and 252, or can be welded thereto as needed and/or desired.

Referring to FIG. 10, the dual conduit section 314 basically includes a pair of refrigerant tubes 350 and 352, a first connector block 354 and a second connector block 356. An insulation layer 358 completely surrounds the outer periphery of the refrigerant tubes 350 and 352. In this embodiment, the refrigerant tubes 350 and 352 are rectangularly shaped and concentrically arranged. The refrigerant tubes 350 and 352 can be either formed integrally as a single element by, for instance, an extruding process or formed as two separate tubes that are fixedly coupled together. In either case, the dual conduit section 314 of FIG. 10 has a shared wall 360 formed between the refrigerant tubes 350 and 352 that extends the entire length of the dual conduit section 314 from the first connector block 354 to the second connector block 356. In this embodiment, one of the refrigerant 350 and 352 is a high pressure/high temperature refrigerant tube, while the other refrigerant tube is a low pressure/low temperature refrigerant tube. If the inner tube is the high pressure/high temperature refrigerant tube and the outer tube is the low pressure/low temperature refrigerant tube, then this arrangement is better for the prevention of slugging. On the other hand, if the inner tube is the low pressure/low temperature refrigerant tube and the outer tube is the high pressure/high temperature refrigerant tube, then this arrangement optimizes intercooling. It will be apparent to those skilled in the art from this disclosure that the internal cross sectional areas of the refrigerant tubes 350 and 352 will change depending on which of the refrigerant tubes 350 and 352 which tube is the high pressure/high temperature refrigerant tube and which tube is the low pressure/low temperature refrigerant tube.

The first connector block 354 is formed with a high side threaded opening 374 that is fluidly connected to one of the refrigerant tubes 350 and 352, and a low side threaded opening 376 that is fluidly connected to the other one of the refrigerant tubes 350 and 352. The high side threaded opening 374 is arranged to receive a corresponding fitting on the end of the second connecting tube 42b of the high pressure tubing 28. Similarly, the low side threaded opening 376 is arranged to receive a corresponding fitting on the end of the rear evaporator outlet section 48 of the low pressure tubing 30.

The second connector block 356 is identical to the first connector block 354, except for its orientation and location. Thus, the second connector block 356 of the dual conduit section 314 is preferably a solid block of material arranged to provide simple connection and disconnection of the dual conduit section 314 from elements of the high pressure tubing 28 and the low pressure tubing 30. The second connector block 356 is fixedly attached to forward ends of the refrigerant tubes 350 and 352 such that the high side threaded opening is fluidly connected to one of the refrigerant tubes 350 and 352, and the low side threaded opening is fluidly connected to the other one of the refrigerant tubes 350 and 352.

Also, like the first connector block 354, the second connector block 356 is formed with a high side threaded opening and a low side threaded opening. The high side threaded opening of the second connector block 356 is arranged to receive a corresponding fitting on the end of the first connecting tube 42a of the high pressure tubing 28. Similarly, the low side threaded opening of the second connector block 356 is arranged to receive a corresponding fitting on the end of the front evaporator outlet section 46 of the low pressure tubing 30. The second connector block 356 can be formed integrally with the refrigerant tubes 350 and 352, or can be welded thereto as needed and/or desired.

As used herein to describe the above embodiment, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The terms of degree such as "substantially", "about" and "approximately" as used herein mean a reasonable amount of deviation of the modified term such that the end result is not significantly changed. In other words, these terms can be construed as including a deviation of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle air conditioning system comprising:
   a compressor;
   a condenser operably coupled to the compressor;
   a front evaporator operably coupled between the condenser the compressor;
   a rear evaporator operably coupled between the condenser the compressor;
   a high pressure tube operably coupling the condenser to the front evaporator and the rear evaporator; and
   a low pressure tube operably coupling the rear evaporator and the front evaporator to the compressor, at least a portion of the high pressure tube and at least a portion of the low pressure tube extending at least partway between the front evaporator and the rear evaporator being formed as a dual conduit section having side-by-side relationship of at least one wall for heat exchange therebetween, the dual conduit section being formed unitarily as a single element.

2. The vehicle air conditioning system according to claim 1, wherein
   at least a portion of the dual conduit section is arranged and configured to extend under a floor of a vehicle, the portion of the dual conduit section being insulated against external heat exchange.

3. The vehicle air conditioning system as set forth in claim 1, wherein
   the portion of the high pressure tube has a first width and the one wall between the portion of the high pressure tube and the portion of the low pressure tube has a width that is approximately the same as the first width.

4. A vehicle air conditioning system comprising:
   a compressor;
   a condenser operably coupled to the compressor;
   a front evaporator operably coupled between the condenser the compressor;
   a rear evaporator operably coupled between the condenser the compressor;
   a high pressure tube operably coupling the condenser to the rear evaporator and the front evaporator; and
   a low pressure tube operably coupling the front evaporator and the rear evaporator to the compressor, at least a portion of the high pressure tube and at least a portion of the low pressure tube extending at least partway between the front evaporator and the rear evaporator being formed as a dual conduit section having side-by-side relationship of at least one wall for heat exchange therebetween, the dual conduit section including a first coupling block at one end and a second coupling block at a second end with the high and low pressure tubes being coupled thereto.

5. The vehicle air conditioning system as set forth in claim 4, wherein
an insulating material surrounds the dual conduit section extending between the coupling block at the first end and the coupling block at the second end.

6. The vehicle air conditioning system as set forth in claim 4, wherein
the portion of the high pressure tube has a first width and the one wall between the portion of the high pressure tube and the portion of the low pressure tube has a width that is approximately the same as the first width.

7. A vehicle air conditioning system comprising:
a compressor;
a condenser operably coupled to the compressor;
a front evaporator operably coupled between the condenser the compressor;
a rear evaporator operably coupled between the condenser the compressor;
a high pressure tube operably coupling the condenser to the front evaporator and the rear evaporator; and
a low pressure tube operably coupling the rear evaporator and the front evaporator to the compressor, at least a portion of the high pressure tube and at least a portion of the low pressure tube extending at least partway between the front evaporator and the rear evaporator being formed as a dual conduit section having side-by-side relationship of at least one wall for heat exchange therebetween and at least a portion of the dual conduit section being arranged and configured to extend under a floor of a vehicle, the portion of the dual conduit section being insulated against external heat exchange and the dual conduit section including a first coupling block at one end and a second coupling block at a second end with the high and low pressure tubes being coupled thereto.

8. The vehicle air conditioning system as set forth in claim 7, wherein
an insulating material surrounds the dual conduit section extending between the coupling block at the first end and the coupling block at the second end.

9. The vehicle air conditioning system as set forth in claim 7, wherein
the portion of the high pressure tube has a first width and the one wall between the portion of the high pressure tube and the portion of the low pressure tube has a width that is approximately the same as the first width.

10. A vehicle air conditioning system comprising:
a compressor;
a condenser operably coupled to the compressor;
a front evaporator operably coupled between the condenser the compressor;
a rear evaporator operably coupled between the condenser the compressor;
a high pressure tube operably coupling the condenser to the front evaporator and the rear evaporator; and
a low pressure tube operably coupling the front evaporator and the rear evaporator to the compressor, at least a portion of the high pressure tube and at least a portion of the low pressure tube extending at least partway between the front evaporator and the rear evaporator being formed as a dual conduit section having side-by-side relationship of at least one wall for heat exchange therebetween,
the side-by-side relationship between the portions of the high and low pressure tubes of the dual conduit section comprises a single shared wall therebetween and the portions of the high and low pressure tubes of the dual conduit section are non-concentrically arranged conduits.

11. The vehicle air conditioning system as set forth in claim 10, wherein
the portion of the high pressure tube has a first width and the one wall between the portion of the high pressure tube and the portion of the low pressure tube has a width that is approximately the same as the first width.

12. A vehicle air conditioning system comprising:
a compressor;
a condenser operably coupled to the compressor;
a front evaporator operably coupled between the condenser the compressor;
a rear evaporator operably coupled between the condenser the compressor;
a high pressure tube operably coupling the condenser to the front evaporator and the rear evaporator; and
a low pressure tube operably coupling the rear evaporator and the front evaporator to the compressor, at least a portion of the high pressure tube and at least a portion of the low pressure tube extending at least partway between the front evaporator and the rear evaporator being formed as a dual conduit section having a first outer wall, a second outer wall, and a shared wall, the first outer wall and the shared wall defining a low pressure refrigerant passageway, the second outer wall and the shared wall defining a high pressure refrigerant passageway, the shared wall providing heat exchange between the low pressure refrigerant passageway and the high pressure refrigerant passageway.

13. The vehicle air conditioning system as set forth in claim 12, wherein
an insulating material surrounds at least the dual conduit section.

14. The vehicle air conditioning system as set forth in claim 12, wherein
the dual conduit section is formed of a metal material having a predetermined heat sink providing mass.

15. The vehicle air conditioning system as set forth in claim 12, wherein
the dual conduit section is formed unitarily as a single element.

16. The vehicle air conditioning system as set forth in claim 12, wherein
the dual conduit section includes a first coupling block at one end and a second coupling block at a second end with the high and low pressure tubes being coupled thereto.

17. The vehicle air conditioning system as set forth in claim 16, wherein
an insulating material surrounds the dual conduit section extending between the coupling block at the first end and the coupling block at the second end.

18. The vehicle air conditioning system as set forth in claim 12, wherein
the low pressure refrigerant passageway and the high pressure refrigerant passageway of the dual conduit section are non-concentrically arranged conduits.

19. The vehicle air conditioning system as set forth in claim 12, wherein
the portion of the high pressure tube has a first width and the shared wall between the portion of the high pressure tube and the portion of the low pressure tube has a width that is approximately the same as the first width.

20. The vehicle air conditioning system as set forth in claim 12, wherein the portion of the high pressure tube has a first width and the shared wall between the portion of the high pressure tube and the portion of the low pressure tube has a width that is the same as the first width.

21. A vehicle air conditioning system comprising:
a compressor;
a condenser operably coupled to the compressor;
a front evaporator operably coupled between the condenser the compressor;
a rear evaporator operably coupled between the condenser the compressor;
a high pressure tube operably coupling the condenser to the front evaporator and the rear evaporator; and
a low pressure tube operably coupling the rear evaporator and the front evaporator to the compressor, at least a portion of the high pressure tube and at least a portion of the low pressure tube extending at least partway between the front evaporator and the rear evaporator being formed as a dual conduit section with a side-by-side non-concentrically arranged relationship having a first outer wall, a second outer wall, and a shared wall, the first outer wall and the shared wall defining a low pressure refrigerant passageway, the second outer wall and the shared wall defining a high pressure refrigerant passageway, the shared wall providing heat exchange between the low pressure refrigerant passageway and the high pressure refrigerant passageway.

22. The vehicle air conditioning system as set forth in claim 21, wherein
an insulating material surrounds at least the dual conduit section.

23. The vehicle air conditioning system as set forth in claim 21, wherein
the dual conduit section is formed unitarily as a single element.

24. The vehicle air conditioning system as set forth in claim 21, wherein
the dual conduit section includes a first coupling block at one end and a second coupling block at a second end with the high and low pressure tubes being coupled thereto.

25. The vehicle air conditioning system as set forth in claim 24, wherein
an insulating material surrounds the dual conduit section extending between the coupling block at the first end and the coupling block at the second end.

26. The vehicle air conditioning system as set forth in claim 21, wherein
the portion of the high pressure tube has a first width and the shared wall between the portion of the high pressure tube and the portion of the low pressure tube has a width that is approximately the same as the first width.

27. A vehicle air conditioning system comprising:
a compressor including a high pressure side and a low pressure side;
a condenser fluidly coupled to the compressor;
a front evaporator fluidly coupled between the condenser the compressor;
a rear evaporator fluidly coupled between the condenser the compressor;
a high pressure tube including a front condenser outlet section fluidly connecting the condenser to the front evaporator, and a rear condenser outlet section fluidly connecting the front evaporator to the rear evaporator such that the front and rear evaporators are arranged in parallel to receive high pressure refrigerant from the condenser; and
a low pressure tube including a rear evaporator outlet section fluidly connecting the rear evaporator to the front evaporator, and a front evaporator outlet section fluidly connecting the front evaporator to the low pressure side of the compressor, at least a portion of the rear condenser outlet section of the high pressure tube and at least a portion of the rear evaporator outlet section of the low pressure tube being formed as a dual conduit section having side-by-side relationship of at least one wall for heat exchange therebetween.

28. The vehicle air conditioning system as set forth in claim 27, wherein
the portion of the rear condenser outlet section has a first width and the one wall between the portion of the rear condenser outlet section and a portion of the rear evaporator outlet section has a width that is approximately the same as the first width.

* * * * *